(12) United States Patent
Baker

(10) Patent No.: US 9,088,119 B2
(45) Date of Patent: Jul. 21, 2015

(54) CABLE ASSEMBLY

(71) Applicant: LENOVO ENTERPRISE SOLUTIONS (SINGAPORE) PTE. LTD., New Tech Park (SG)

(72) Inventor: Anthony E. Baker, Stittsville (CA)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 259 days.

(21) Appl. No.: 13/745,824

(22) Filed: Jan. 20, 2013

(65) Prior Publication Data

US 2014/0205243 A1 Jul. 24, 2014

(51) Int. Cl.
*G02B 6/36* (2006.01)
*H01R 31/00* (2006.01)

(52) U.S. Cl.
CPC .......... *H01R 31/005* (2013.01); *H01R 2201/06* (2013.01)

(58) Field of Classification Search
None
See application file for complete search history.

(56) References Cited

U.S. PATENT DOCUMENTS

| | | | |
|---|---|---|---|
| 6,364,539 B1 | 4/2002 | Shahid | |
| 7,031,574 B2 | 4/2006 | Huang et al. | |
| 7,044,656 B1 | 5/2006 | Hofmeister et al. | |
| 7,237,966 B2 * | 7/2007 | Quinby et al. | 385/78 |
| 7,620,754 B2 | 11/2009 | Yee et al. | |
| 7,624,203 B2 | 11/2009 | Blinick et al. | |
| 7,639,178 B1 | 12/2009 | Mulbrook et al. | |
| 7,729,618 B2 | 6/2010 | Tatum et al. | |
| 7,731,432 B2 | 6/2010 | Theodoras, II et al. | |
| 8,075,199 B2 | 12/2011 | Losio et al. | |
| 8,165,471 B2 | 4/2012 | Theodoras, II et al. | |
| 8,200,097 B2 | 6/2012 | Cole | |
| 2007/0230889 A1 | 10/2007 | Sato et al. | |
| 2007/0237472 A1 | 10/2007 | Aronson et al. | |
| 2007/0269170 A1 | 11/2007 | Easton et al. | |
| 2011/0130032 A1 | 6/2011 | Mazzini et al. | |
| 2011/0225341 A1 | 9/2011 | Satoh et al. | |
| 2011/0249967 A1 | 10/2011 | Bhoja et al. | |
| 2011/0255574 A1 | 10/2011 | Carter et al. | |
| 2011/0255827 A1 | 10/2011 | Schmidt et al. | |
| 2012/0051735 A1 | 3/2012 | Achkir et al. | |
| 2012/0093518 A1 | 4/2012 | Tosetti et al. | |
| 2012/0189259 A1 * | 7/2012 | Manes | 385/135 |
| 2013/0266273 A1 * | 10/2013 | Sherazi | 385/89 |

* cited by examiner

*Primary Examiner* — Sung Pak
(74) *Attorney, Agent, or Firm* — Katherine Brown

(57) ABSTRACT

A cable assembly can include a single C form-factor pluggable (CFP) connector adhering to a CFP multi-source agreement (MSA), and providing a maximum bandwidth of between 100 and 120 gigabits-per-second (Gbps) over ten-to-twelve lanes. The cable assembly can include, for instance, one, two, or three quad small form-factor pluggable (QSFP/QSFP+) connectors adhering to a QSFP/QSFP+ MSA, and each providing a maximum bandwidth of forty Gbps over four lanes. The cable assembly can include one or more cables equal in number to the QSFP/QSFP+ connectors and each connecting the single CFP connector to the one of the QSFP/QSFP+ connectors. The four lanes over which each QSFP/QSFP+ connector provides the maximum bandwidth of forty Gbps corresponds to a different four of the ten-to-twelve lanes over which the single CFP connector provides the maximum bandwidth of between 100 and 120 Gbps.

24 Claims, 3 Drawing Sheets

CABLE ASSEMBLY

BACKGROUND

Ethernet has evolved to meet the growing demands of packet-switched networks. It has become the unifying technology enabling communications via the Internet and other networks using the Internet Protocol (IP). Due to its proven low cost, known reliability, and simplicity, the majority of today's Internet traffic starts or ends on an Ethernet connection. This popularity has resulted in a complex ecosystem among carrier networks, enterprise networks, and consumers, creating a symbiotic relationship among its various parts.

At first, Ethernet speeds were typically limited to ten or one-hundred megabits-per-second (Mbps), and then increased to one gigabit-per-second (Gbps). However, with the needs for increasing bandwidth, it is not uncommon to encounter ten Gbps speeds, and even forty and one-hundred Gbps speeds have become available. A multitude of different connectors have evolved to support such higher Ethernet speeds, beyond the common RJ45 connectors used for one Gbps and lower speeds.

SUMMARY

An example cable assembly of the disclosure includes a first connector adhering to a first standard and providing a first total maximum bandwidth. The cable assembly includes one or more second connectors adhering to a second standard different than the first standard. Each second connector provides a second total maximum bandwidth. A number of the second connectors multiplied by the second total maximum bandwidth is no greater than the first total maximum bandwidth. The cable assembly includes one or more cables. Each cable connects the first connector to a different one of the second connectors. A number of the cables is equal in number to the second connectors.

A second example cable assembly of the disclosure includes a single C form-factor pluggable (CFP) connector adhering to a CFP multi-source agreement (MSA), and providing a maximum bandwidth of between 100 and 120 gigabits-per-second (Gbps) over ten-to-twelve lanes. The cable assembly includes a single quad small form-factor pluggable (QSFP/QSFP+) connector adhering to a QSFP/QSFP+ MSA, and providing a maximum bandwidth of forty Gbps over four lanes. The cable assembly includes a single cable connecting the single CFP connector to the single QSFP/QSFP+ connector. The four lanes over which the single QSFP/QSFP+ connector provides the maximum bandwidth of forty Gbps corresponds to four of the ten-to-twelve lanes over which the single CFP connector provides the maximum bandwidth of between 100 and 120 Gbps, such that six-to-eight of the ten-to-twelve lanes have to remain unused within the cable assembly.

A third example cable assembly of the disclosure includes a single CFP connector adhering to a CFP MSA, and providing a maximum bandwidth of between 100 and 120 Gbps over ten-to-twelve lanes. The cable assembly includes a pair of QSFP/QSFP+ connectors adhering to a QSFP/QSFP+ MSA. Each QSFP/QSFP+ connector provides a maximum bandwidth of forty Gbps over four lanes. The cable assembly includes a pair of cables. Each cable connects the single CFP connector to one of the pair of QSFP/QSFP+ connectors. The four lanes over which each QSFP/QSFP+ connector provides the maximum bandwidth of forty Gbps corresponds to a different four of the ten-to-twelve lanes over which the single CFP connector provides the maximum bandwidth of between 100 and 120 Gbps, such that two-to-four of the ten-to-twelve lanes have to remain unused within the cable assembly.

A fourth example cable assembly of the disclosure includes a single CFP connector adhering to a CFP MSA, and providing a maximum bandwidth of between 100 and 120 Gbps over twelve lanes. The cable assembly includes exactly three QSFP/QSFP+ connectors adhering to a QSFP/QSFP+ MSA. Each QSFP/QSFP+ connector provides a maximum bandwidth of forty Gbps over four lanes. The cable assembly includes exactly three cables. Each cable connects the single CFP connector to one of the exactly three QSFP/QSFP+ connectors. The four lanes over which each QSFP/QSFP+ connector provides the maximum bandwidth of forty Gbps corresponds to a different four of the twelve lanes over which the single CFP connector provides the maximum bandwidth of between 100 and 120 Gbps, such that none of the lanes have to remain unused within the cable assembly.

An example system of the disclosure includes a networking device having first lane hardware. Each first lane hardware has a first maximum bandwidth and provides a first lane. A first total maximum bandwidth is equal to a number of the first lane hardware multiplied by the first maximum bandwidth. The networking device includes a connector communicatively connected to the first lanes. The system includes a cable assembly physically and removably connected to the connector of the networking device.

The cable assembly of the example system includes a first connector adhering to a first standard and providing the first maximum bandwidth. The cable assembly includes one or more second connectors adhering to a second standard different than the first standard. Each second connector provides a second total maximum bandwidth divided over second lanes. Each second lane has a second maximum bandwidth. A number of the second connectors multiplied by the second total maximum bandwidth is no greater than the first total maximum bandwidth. A number of the second lanes multiplied by the second maximum bandwidth is equal to the second total maximum bandwidth. The cable assembly includes one or more cables. Each cable connects the first connector to a different one of the second connectors. A number of the cables is equal in number to the second connectors. Each second connector is receptive to physical and removable connection to a corresponding connector of an electronic device having second lane hardware providing the second lanes. As such, the first total maximum bandwidth is sharable by a maximum number of electronic devices equal in number to the second connectors, and each electronic device is to use no more than the second total maximum bandwidth of the first total maximum bandwidth.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

DETAILED DESCRIPTION

Figure 1:
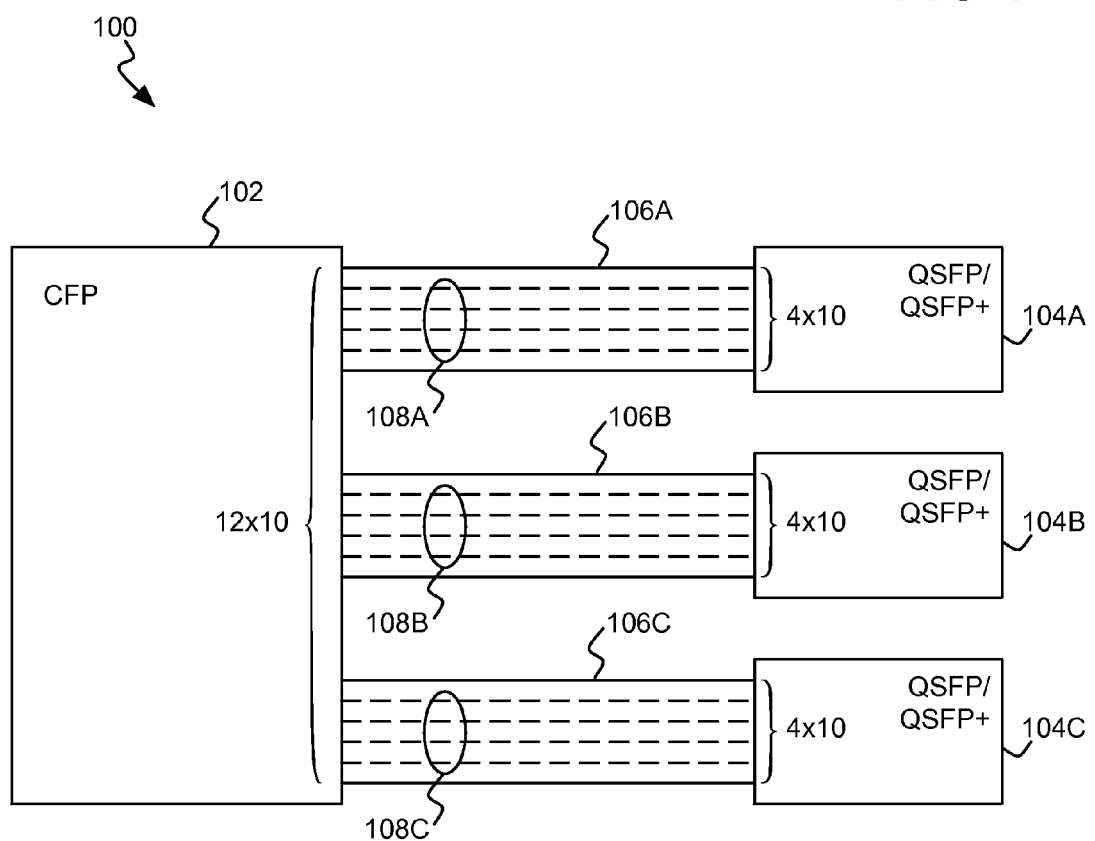
FIG. 1 is a diagram of an example cable assembly in which a C form-factor pluggable (CFP) connector is connected to three quad small form-factor pluggable (QSFP/QSFP+) connectors via three corresponding cables.

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

As noted in the background section, a multitude of different connectors have evolved to support higher Ethernet speeds. One such connector is the quad small form-factor pluggable (QSFP/QSFP+) connector, which typically supports Ethernet data rates up to forty gigabits-per-second (Gbps) over four 10-Gbps channels or lanes. A QSFP/QSFP+ connector adheres to the QSFP/QSFP+ multi-source agreement (MSA), which was agreed upon by members of the QSFP MSA Group.

However, currently QSFP/QSFP+ connectors cannot support Ethernet speeds over forty Gbps. Therefore, to support higher data rates, another connector has been developed. This connector is the C form-factor pluggable (CFP) connector, which adheres to the CFP MSA that was agreed upon by members of the CFP MSA Group. A CFP connector commonly supports Ethernet data rates up to 100 Gbps over ten 10-Gbps channels or lanes. However, the CFP MSA can less commonly support Ethernet data rates up to 120 Gbps over twelve 10-Gbps channels or lanes.

A shortcoming of these different connectors is that networking devices exposing just QSFP/QSFP+ connectors cannot be connected to networking devices exposing just CFP connectors, yielding to incompatibility headaches for network administrators and other users. Furthermore, even if a networking device exposing just QSFP/QSFP+ connectors could be connected to networking devices exposing just CFP connectors, the Ethernet speed mismatch between the former and the latter connectors would mean that much networking bandwidth could potentially go unused. For example, in a worse case scenario, a device supporting 120 Gbps at a CFP connector connected to a device supporting forty Gbps at a QSFP/QSFP+ would mean that eighty Gbps of the bandwidth provided by the former device could go unused.

Example cable assemblies disclosed herein resolve these shortcomings. A cable assembly includes a first connector, such as a CFP connector, which provides a first total maximum bandwidth, such as between 100 and 120 Gbps. The cable assembly includes one or more second connectors, such as QSFP/QSFP+ connectors, which each provide a second total maximum bandwidth, such as forty Gbps. The number of the second connectors multiplied by this second total maximum bandwidth is no greater than the first total maximum bandwidth. For example, in the case where the first connector provides 120 Gbps at most, and each second connector provides 40 Gbps at most, there are no more than three second connectors. The cable assembly also includes one or more cables equal in number to the second connectors, and which each connect the first connector to a different second connector.

In this way, the example cable assemblies disclosed herein resolve the shortcomings noted above. First, networking devices exposing different types of connectors can still be connected to one another. Second, networking devices exposing different types of connectors that support mismatched data rates can be connected to one another in a manner that ensures that little or no bandwidth could go unused. For example, one device may support 120 Gbps at a CFP connector, and via an example cable assembly disclosed herein can be connected to three other devices that each support 40 Gbps at a QSFP/QSFP+ connector. As such, the full bandwidth of 120 Gbps supported by the former device can be used by the three latter devices that can each just support 40 Gbps.

FIG. 1 shows an example cable assembly 100. The cable assembly 100 includes a CFP connector 102 and three QSFP/QSFP+ connectors 104A, 104B, and 104C, which are collectively referred to as the QSFP/QSFP+ connectors 104. Three cables 106A, 106B, and 106C, collectively referred to as the three cables 106, connect the CFP connector 102 to the QSFP/QSFP+ connectors 104. More specifically, each cable 106 connects the CFP connector 102 to a different one of the QSFP/QSFP+ connectors 104. Because there are three QSFP/QSFP+ connectors 104, the cable assembly 100 can connect one networking device at the CFP connector 102 to up to three different networking devices at the QSFP/QSFP+ connectors 104.

The CFP connector 102 adheres to the CFP MSA, and is more generally a first connector adhering to a first standard. The CFP connector 102 provides a total maximum bandwidth of 120 Gbps, which can be divided over twelve lanes provided by a networking device to which the CFP connector 102 can be physically connected. Each such lane thus provides a maximum bandwidth of ten Gbps.

A lane is a network communication channel. Data can be communicated over such a lane. A networking device is said to provide the lane (i.e., the network communication channel or lane) in that the networking device includes lane hardware that can transmit and receive data over the lane. The data may be sent and received on a lane in accordance with an Ethernet protocol or standard, for instance.

Each QSFP/QSFP+ connector 104 adheres to the QSFP/QSFP+ MSA, and is more generally a second connector adhering to a second standard. Each QSFP/QSFP+ connector 104 provides a total maximum bandwidth of forty Gbps divided over four lanes provided by a networking device to which the QSFP/QSFP+ connector 104 in question can be physically connected. Each such lane thus provides a maximum bandwidth of ten Gbps.

The cables 106 can be passive or active cables. Passive cables are cables in which there are no integrated electronics. Conductors directly connect the CFP connector 102 to the QSFP/QSFP+ connectors 104 to directly relay signals between the networking device connected to the connector 102 and the networking device(s) connected to the connectors 104 without repeating, amplification, or other signal processing. Active cables are cables in which there are integrated electronics. Conductors connecting the CFP connector 102 to the QSFP/QSFP+ connectors 104 are augmented by electronics to repeat, amplify, or perform other signal processing on signals relayed between the networking device connected to the connector 102 and the networking device(s) connected to the connectors 104.

Passive cables have the advantage of being less costly to manufacture as compared to active cables. However, active cables have the advantage of generally being able to have greater lengths than passive cables while still maintaining signal integrity. For example, the cables 106 if passive may be able to have a maximum length of 8.5 meters each, whereas the cables 106 if active may be able to have a maximum length of twenty meters each.

Depicted in FIG. 1 are the four network communication lanes or channels 108 for each cable 106, via dotted lines, and which have the maximum bandwidth of ten Gbps each. Specifically, the cable 106A provides four network communication channels or lanes 108A, the cable 106B provides four such channels or lanes 108B, and the cable 106C provides four such channels or lanes 108C. The network communication channels or lanes 108A, 108B, and 108C are collectively referred to as the network communication channels or lanes 108.

In the example cable assembly 100 of FIG. 1, no bandwidth provided by the networking device connected to the CFP connector 102 has to remain unused. That is, none of the lanes of this networking device providing this bandwidth have to remain unused. This is because the total maximum bandwidth of the CFP connector 102, which is 120 Gbps, is equal to the number of QSFP/QSFP+ connectors 104 multiplied by the total maximum bandwidth of each QSFP/QSFP+ connector 104, or 3×40. As such, minimal or none of the bandwidth provided by the networking device connector to the CFP connector 102 has to be wasted. In particular, no bandwidth is wasted if each QSFP/QSFP+ connector 104 is connected to a networking device supporting the maximum forty Gbps date rate.

Figure 2:
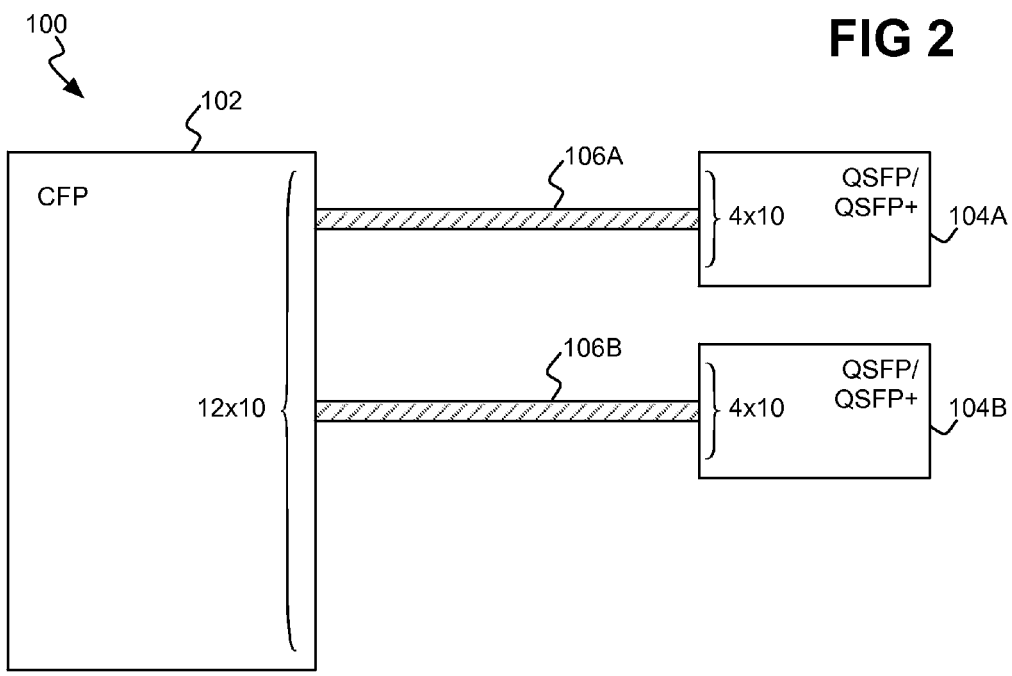
FIG. 2 is a diagram of an example cable assembly in which a CFP connector is connected to two QSFP/QSFP+ connectors via two corresponding cables.

FIG. 2 shows another example of the cable assembly 100. The cable assembly 100 of FIG. 2 differs from that of FIG. 1 at least in the respect that there are two QSFP/QSFP+ connectors 104 and two corresponding cables 106 in FIG. 2 as opposed to three of each as in FIG. 3. Thus, the cable assembly 100 of FIG. 2 includes a CFP connector 102 and two QSFP/QSFP+ connectors 104A and 104B, which are collectively referred to as the QSFP/QSFP+ connectors 104. Two cables 106A and 106B, collectively referred to as the two cables 106, connect the CFP connector 102 to the QSFP/QSFP+ connectors 104. More specifically, each cable 106 connects the CFP connector 102 to a different one of the QSFP/QSFP+ connectors 104. Because there are two QSFP/QSFP+ connectors 104, the cable assembly 100 of FIG. 2 can connect one networking device at the CFP connector 102 to up to two different networking devices at the QSFP/QSFP+ connectors 104.

The CFP connector 102 is in FIG. 2 as is described in relation to FIG. 1, but may provide a total maximum bandwidth of 100 Gbps instead of 120 Gbps, and which is divided over ten lanes provided by a networking device to which the CFP connector 102 can be physically connected. Each such lane thus provides a maximum bandwidth of ten Gbps. Each QSFP/QSFP+ connector 104 is in FIG. 2 as is described in relation to FIG. 1, and can provide a total maximum bandwidth of forty Gbps divided over four lanes provided by a networking device to which the QSFP/QSFP+ connector 104 in question can be physically connected. Each such lane thus provides a maximum bandwidth of ten Gbps.

The cables 106 are in FIG. 2 as is described in relation to FIG. 1, and therefore can be passive or active. The network communication lanes or channels 108 depicted in FIG. 1 are present in the cable assembly 100 of FIG. 2, but are not explicitly shown in FIG. 2 for illustrative clarity and convenience. Each network communication lane or channel is in FIG. 2 as is described in relation to FIG. 1.

In the example cable assembly 100 of FIG. 2, some bandwidth provided by the networking device connected to the CFP connector 102 has to remain unused. Particularly, two of the lanes of this networking device providing this bandwidth have to remain unused where there are ten total lanes, and four of the lanes have to remain unused where there are twelve total lanes. This is because the total maximum bandwidth of the CFP connector 102, which is 100 or 120 Gbps, is greater than the number of QSFP/QSFP+ connectors 104 multiplied by the total maximum bandwidth of each QSFP/QSFP+ connector 104, or 2×40. Therefore, no less than twenty Gbps of the 100 Gbps bandwidth or forty of the 120 Gbps bandwidth at the CFP connector 102 is wasted even if each QSFP/QSFP+ connector 104 is connected to a networking device supporting the maximum forty Gbps data rate.

Figure 3:
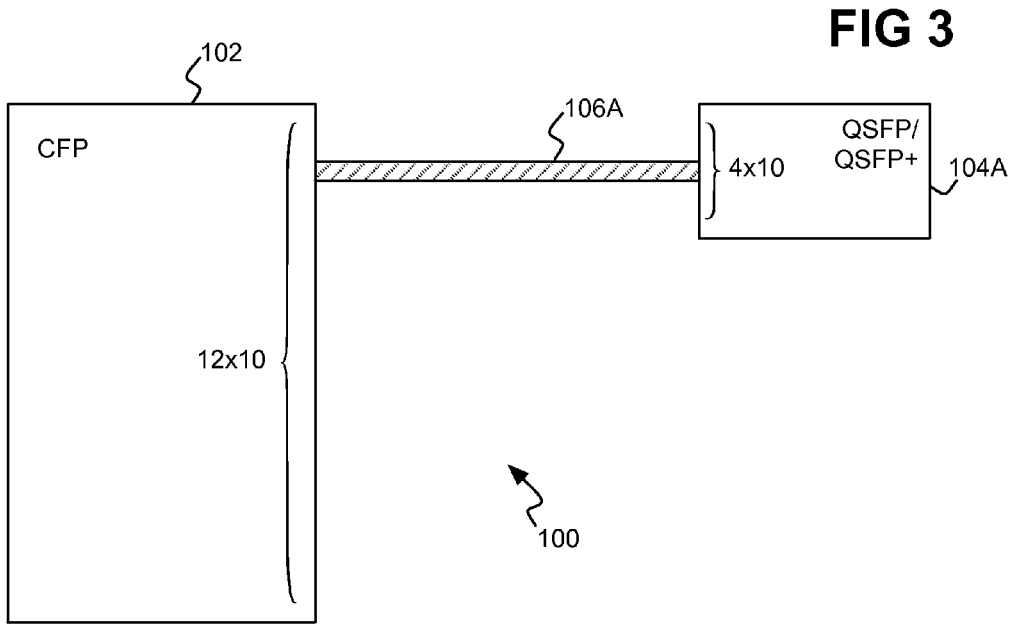
FIG. 3 is a diagram of an example cable assembly in which a CFP connector is connected to one QSFP/QSFP+ connector via one corresponding cable.

FIG. 3 shows a third example of the cable assembly 100. The cable assembly 100 of FIG. 3 differs from that of FIGS. 1 and 2 at least in the respect that there is just one QSFP/QSFP+ connector 104 and just one corresponding cable 106 in FIG. 3. Thus, the cable assembly 100 of FIG. 3 includes a CFP connector 102 and one QSFP/QSFP+ connector 104A. One cable 106A connects the CFP connector 102 to the QSFP/QSFP+ connector 104A. Because there is just one QSFP/QSFP+ connector 104, the cable assembly 100 of FIG. 3 can connect one networking device at the CFP connector 102 to up to just one networking device, at the QSFP/QSFP+ connector 104A.

The CFP connector 102 is in FIG. 3 as is described in relation to FIG. 2, and can provide a total maximum bandwidth of 100 Gbps divided over ten lanes of a networking device to which the CFP connector 120 can be physically connected, or of 120 Gbps divided over twelve such lane of this device. Each lane provides a maximum bandwidth of ten Gbps. The QSFP/QSFP+ connector 104A is in FIG. 3 as is described in relation to FIG. 2, and can provide a total maximum bandwidth of forty Gbps divided over four lanes provided by a networking device to which the QSFP/QSFP+ connector 104A can be physically connected. Each such lane can provide a maximum bandwidth of ten Gbps.

The cable 106A is in FIG. 3 as is described in relation to FIG. 2, and thus can be passive or active. The network communication lanes or channels 108 depicted in FIG. 1 are again present in the cable assembly 100 of FIG. 3, but are not explicitly shown in FIG. 3 for illustrative clarity and convenience. Each network communication lane or channel is in FIG. 3 as is described in relation to FIG. 1.

In the example cable assembly 100 of FIG. 3, at least some bandwidth provided by the networking device connected to the CFP connector 102 has to remain unused. Particularly, six of the lanes of this networking device providing this bandwidth have to remain unused where there are ten total lanes, and eight of the lanes have to remain unused where there are twelve total lanes. This is because the total maximum bandwidth of the CFP connector 102, which is 100 or 120 Gbps, is greater than the total maximum bandwidth of the only QSFP/QSFP+ connector 104A, which is 40 Gbps. Therefore, no less than sixty Gbps of the 100 Gbps bandwidth or eighty Gbps of the 120 Gbps bandwidth of the CFP connector 102 is wasted even if the QSFP/QSFP+ connector 104A is connected to a networking device supporting the maximum forty Gbps data rate.

Figure 4:
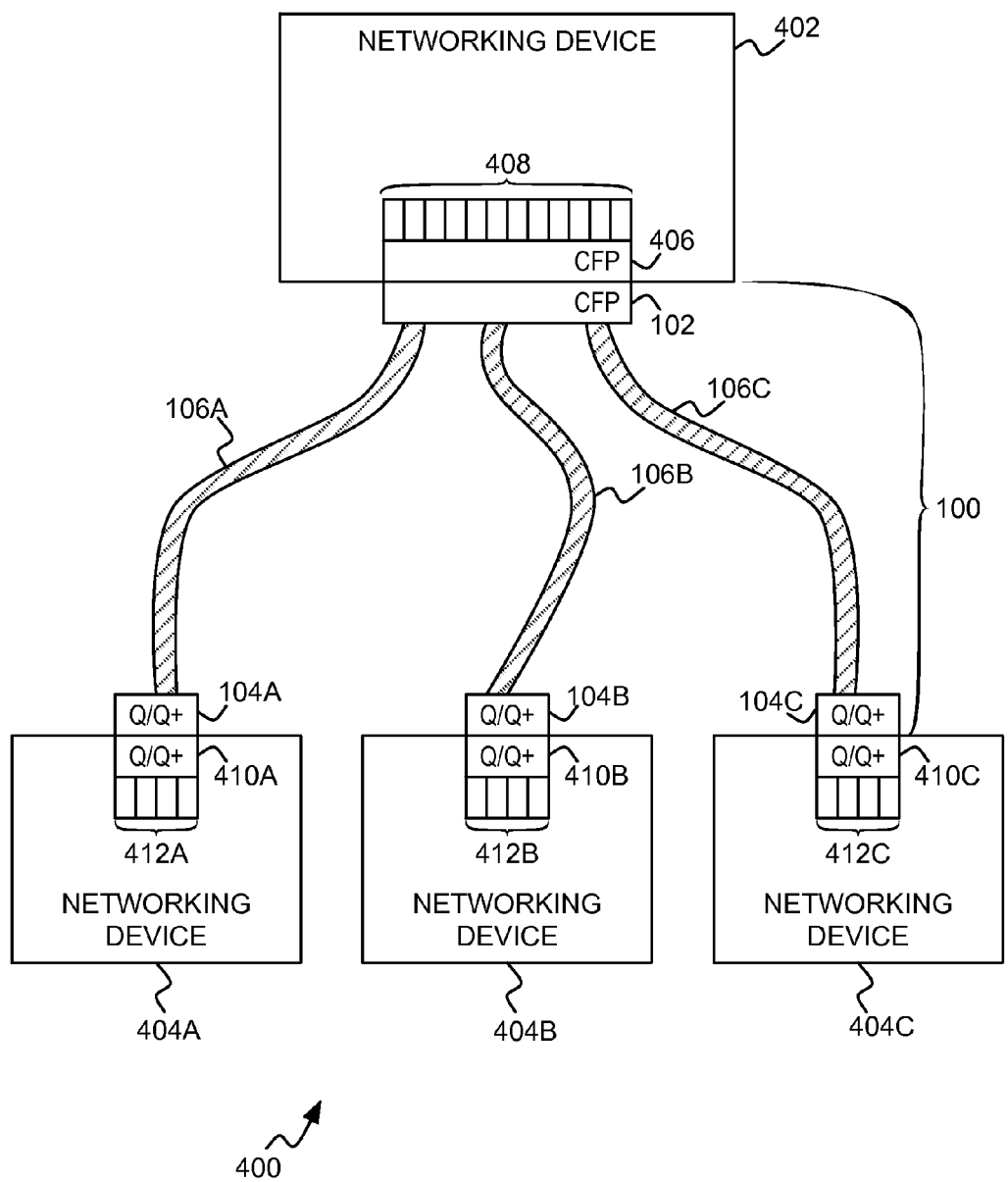
FIG. 4 is a diagram of an example system including an example cable assembly in which a CFP connector is connected to one or more QSFP/QSFP+ connectors via one or more corresponding cables.

FIG. 4 shows an example system 400 in which the example cable assembly 100 that has been described can be employed.

In the example of FIG. 4, the cable assembly 10 is depicted as including the CFP connector 102, three QSFP/QSFP+ connectors 104, and three cables 106 connecting the connector 102 to the connectors 104, as in FIG. 1. However, in other implementations, there can be just two QSFP/QSFP+ connectors 104 and two cables 106 as in FIG. 2, or just one QSFP/QSFP+ connector 104 and one cable 106 as in FIG. 3.

The system 400 includes a networking device 402 communicatively connected via the cable assembly 100 to three networking devices 404A, 404B, and 404C, which are collectively referred to as the networking devices 404. However, where there are just two QSFP/QSFP+ connectors 104 and two cables 106 within the cable assembly 100, then the networking device 402 can connect via the cable assembly 100 to just two networking devices 404. Likewise, where there is just one QSFP/QSFP+ connector 104 and one cable 106 within the cable assembly 100, then the networking device 402 can connect via the cable assembly 100 to just one networking device 404.

Each of the networking devices 402 and 404 can be a type of networking equipment, such as a switch, a router, a hub, and so on. Each of the networking devices 402 and 404 may be a computing device like a server computing device or a client computing device or other switch element. Each of the networking devices 402 and 404 may be another type of device as well, so long as it includes networking functionality.

The networking device 402 includes a CFP connector 406 that is physically and removably connected to the CFP connector 102 of the cable assembly 100. The networking device 402 includes lane hardware 408, such as twelve in the example of FIG. 4, or ten, or another number. Each lane hardware 408 may be considered as including the hardware components by which the networking device 402 can communicate over a separate network communication channel or lane. Each lane hardware 408 may provide a bandwidth of ten Gbps, for instance over a corresponding lane. As such, the total maximum bandwidth of the networking device 402 is equal to the number of such lane hardware 408 multiplied by this bandwidth, such as 120 Gbps in the example of FIG. 4.

The networking devices 404A, 404B, and 404C include QSFP/QSFP+ connectors 410A, 410B, and 410C, respectively, which are collectively referred to as the QSFP/QSFP+ connectors 410 of the networking devices 404. The QSFP/QSFP+ connectors 410A, 410B, and 410C are physically and removably connected to the QSFP/QSFP+ connectors 104A, 104B, and 104C, respectively, of the cable assembly 100. As such, the networking devices 404 are each communicatively connected to the networking device 402, via the same cable assembly 100.

The networking devices 404A, 404B, and 404C include lane hardware 412A, 412B, and 412C, respectively, which are collectively referred to as the lane hardware 412 of the networking devices 404. There is multiple lane hardware 412A communicatively connected to the QSFP/QSFP+ connector 410A, multiple lane hardware 412B communicatively connected to the QSFP/QSFP+ connector 410B, and multiple lane hardware 412C communicatively connected to the QSFP/QSFP+ connector 410C. For instance, there are four each of the lane hardware 412A, 412B, and 412C in the example of FIG. 4.

Each lane hardware 412A, 412B, and 412C may be considered as including the hardware components by which its corresponding networking device 404 can communicate over a separate network communication channel or lane. Each lane hardware 412A, 412B, and 412C may provide a bandwidth of ten Gbps, for instance. As such, the total maximum bandwidth of each networking device 404 is equal to the number of such lane hardware 412 of the networking device 404 in question multiplied by this bandwidth, such as forty Gbps in the example of FIG. 4.

In the example system of FIG. 4, the total maximum bandwidth at the networking device 402 is used to communicate with three different networking devices 404 in increments equal to the total maximum bandwidth of each networking device 404. For example, four of the twelve lanes provided by the lane hardware 408 of the networking device 402 are used to communicate with the four lanes provided by the lane hardware 412A of the networking device 404A. A different four lanes of the twelve lanes provided by the lane hardware 408 of the networking device 402 are used to communicate with the four lanes provided by the lane hardware 412B of the networking device 404B. The remaining four lanes of the twelve lanes provided by the lane hardware 408 are used to communicate with the four lanes provided by the lane hardware 412C of the networking device 404C.

In the example system of FIG. 4, then, no bandwidth of the networking device 402 is wasted even though the networking device 402 provides at a single CFP connector 406 greater bandwidth than the bandwidth that any individual networking device 404 provides at its corresponding single QSFP/QSFP+ connector 404. This is because the total maximum bandwidth of the networking device 402 is effectively divided over the three networking devices 404. This in turn is because the cable assembly 100 novelly interconnects the single networking device 402 at its single CFP connector 406 thereof to multiple networking devices 404 at their corresponding single QSFP/QSFP+ connectors 404.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

I claim:

1. A cable assembly comprising:
a first connector adhering to a first standard and providing a first total maximum bandwidth;
one or more second connectors adhering to a second standard different than the first standard, each second connector providing a second total maximum bandwidth, a number of the second connectors multiplied by the second total maximum bandwidth being no greater than the first total maximum bandwidth; and
one or more cables, each cable connecting the first connector to a different one of the second connectors, a number of the cables equal in number to the second connectors,
wherein one or more of:
the first connector is a C form-factor pluggable (CFP) connector, and the first standard is a CFP multi-source agreement (MSA); and
each second connector is a quad small form-factor pluggable (QSFP/QSFP+) connector, and the second standard is a QSFP/QSFP+ multi-source agreement (MSA).

2. The cable assembly of claim 1, wherein the number of the second connectors is equal to one.

3. The cable assembly of claim 1, wherein the number of the second connectors is equal to two.

4. The cable assembly of claim 1, wherein the number of the second connectors is equal to three.

5. The cable assembly of claim 1, wherein the first total maximum bandwidth is divided over a plurality of first lanes, each first lane having a first maximum bandwidth, a number of the first lanes multiplied by the first maximum bandwidth being equal to the first total maximum bandwidth,
and wherein the second total maximum bandwidth is divided over a plurality of second lanes, each second lane having a second maximum bandwidth, a number of the second lanes multiplied by the second maximum bandwidth being equal to the second total maximum bandwidth.

6. The cable assembly of claim 5, wherein each of the first maximum bandwidth and the second maximum bandwidth is ten gigabits-per-second (Gbps).

7. The cable assembly of claim 1, wherein the first connector is the C form-factor pluggable (CFP) connector, and the first standard is the CFP multi-source agreement (MSA).

8. The cable assembly of claim 1, wherein each second connector is the quad small form-factor pluggable (QSFP/QSFP+) connector, and the second standard is the QSFP/QSFP+ multi-source agreement (MSA).

9. The cable assembly of claim 1, wherein the first connector is the C form-factor pluggable (CFP) connector, and the first standard is the CFP multi-source agreement (MSA),
and wherein each second connector is the quad small form-factor pluggable (QSFP/QSFP+) connector, and the second standard is the QSFP/QSFP+MSA.

10. The cable assembly of claim 1, wherein the cables are passive cables.

11. The cable assembly of claim 1, wherein the cables are active cables.

12. A cable assembly comprising:
a single C form-factor pluggable (CFP) connector adhering to a CFP multi-source agreement (MSA), and providing a maximum bandwidth of between 100 and 120 gigabits-per-second (Gbps) over ten-to-twelve lanes;
a single quad small form-factor pluggable (QSFP/QSFP+) connector adhering to a QSFP/QSFP+MSA, and providing a maximum bandwidth of forty Gbps over four lanes; and
a single cable connecting the single CFP connector to the single QSFP/QSFP+ connector,
wherein the four lanes over which the single QSFP/QSFP+ connector provides the maximum bandwidth of forty Gbps corresponds to four of the ten-to-twelve lanes over which the single CFP connector provides the maximum bandwidth of between 100 and 120 Gbps, such that six-to-eight of the ten-to-twelve lanes have to remain unused within the cable assembly.

13. The cable assembly of claim 12, wherein one of:
the single cable is a passive cable;
the single cable is an active cables.

14. A cable assembly comprising:
a single C form-factor pluggable (CFP) connector adhering to a CFP multi-source agreement (MSA), and providing a maximum bandwidth of between 100 and 120 gigabits-per-second (Gbps) over ten-to-twelve lanes;
a pair of quad small form-factor pluggable (QSFP/QSFP+) connectors adhering to a QSFP/QSFP+MSA, each QSFP/QSFP+ connector providing a maximum bandwidth of forty Gbps over four lanes; and
a pair of cables, each cable connecting the single CFP connector to one of the pair of QSFP/QSFP+ connectors,
wherein the four lanes over which each QSFP/QSFP+ connector provides the maximum bandwidth of forty Gbps corresponds to a different four of the ten-to-twelve lanes over which the single CFP connector provides the maximum bandwidth of between 100 and 120 Gbps, such that two-to-four of the ten-to-twelve lanes have to remain unused within the cable assembly.

15. The cable assembly of claim 14, wherein one of:
the pair of cables are passive cables;
the pair of cables are active cables.

16. A cable assembly comprising:
a single C form-factor pluggable (CFP) connector adhering to a CFP multi-source agreement (MSA), and providing a maximum bandwidth of between 100 and 120 gigabits-per-second (Gbps) over twelve lanes;
exactly three quad small form-factor pluggable (QSFP/QSFP+) connectors adhering to a QSFP/QSFP+MSA, each QSFP/QSFP+ connector providing a maximum bandwidth of forty Gbps over four lanes; and
exactly three cables, each cable connecting the single CFP connector to one of the exactly three QSFP/QSFP+ connectors,
wherein the four lanes over which each QSFP/QSFP+ connector provides the maximum bandwidth of forty Gbps corresponds to a different four of the twelve lanes over which the single CFP connector provides the maximum bandwidth of between 100 and 120 Gbps, such that none of the lanes have to remain unused within the cable assembly.

17. The cable assembly of claim 16, wherein one of:
the exactly three cables are passive cables;
the exactly three cables are active cables.

18. A system comprising:
a networking device having a plurality of first lane hardware, each first lane hardware having a first maximum bandwidth and providing a first lane, a first total maximum bandwidth equal to a number of the first lane hardware multiplied by the first maximum bandwidth, the networking device comprising a connector communicatively connected to the first lane hardware; and
a cable assembly physically and removably connected to the connector of the networking device and comprising:
a first connector adhering to a first standard and providing the first maximum bandwidth;
one or more second connectors adhering to a second standard different than the first standard, each second connector providing a second total maximum bandwidth divided over a plurality of second lanes, each second lane having a second maximum bandwidth, a number of the second connectors multiplied by the second total maximum bandwidth being no greater than the first total maximum bandwidth, a number of the second lanes multiplied by the second maximum bandwidth being equal to the second total maximum bandwidth; and
one or more cables, each cable connecting the first connector to a different one of the second connectors, a number of the cables equal in number to the second connectors,
wherein each second connector is receptive to physical and removable connection to a corresponding connector of an electronic device providing the second lanes, such that the first total maximum bandwidth is sharable by a maximum number of electronic devices equal in number to the second connectors, and such that each electronic device is to use no more than the second total maximum bandwidth of the first total maximum bandwidth.

19. The system of claim 18, wherein the number of the second connectors is equal to one, two, or three.

20. The system of claim 18, wherein each of the first maximum bandwidth and the second maximum bandwidth is ten gigabits-per-second (Gbps).

21. The system of claim 18, wherein the first connector is a C form-factor pluggable (CFP) connector, and the first standard is a CFP multi-source agreement (MSA),
and wherein each second connector is a quad small form-factor pluggable (QSFP/QSFP+) connector, and the second standard is a QSFP/QSFP+MSA.

22. The system of claim 18, wherein one of:
the cables are passive cables;
the cables are active cables.

23. The system of claim 18, wherein the networking device comprises a router.

24. The system of claim 18, further comprising:
one or more electronic devices, each electronic device having a plurality of second lane hardware providing the second lanes and comprising a connector physically and removably connected to a different one of the second connectors and communicatively connected to the second lanes over which the different one of the second connectors provides the second total maximum bandwidth.

\* \* \* \* \*